United States Patent
Mixson

(10) Patent No.: US 6,965,080 B2
(45) Date of Patent: Nov. 15, 2005

(54) CAP FOR CABLE CONDUIT

(76) Inventor: Aaron L. Mixson, 3798 Mt. Carmel Rd., Walterboro, SC (US) 29488

( * ) Notice: Subject to any disclaimer, the term of this patent is extended or adjusted under 35 U.S.C. 154(b) by 0 days.

(21) Appl. No.: 10/736,278

(22) Filed: Dec. 15, 2003

(65) Prior Publication Data
US 2005/0126816 A1    Jun. 16, 2005

(51) Int. Cl.$^7$ .............................................. H02G 9/00
(52) U.S. Cl. ..................... 174/75 D; 174/5 R; 174/100; 174/188; 174/74 R; 174/48
(58) Field of Search ........................... 174/75 D, 100, 174/188, 74 R, 5 R, 48

(56) References Cited

U.S. PATENT DOCUMENTS

| | | |
|---|---|---|
| 2,078,991 A | 5/1937 | Baker |
| 2,956,106 A | 10/1960 | Hasselhorn et al. |
| 3,395,382 A * | 7/1968 | Weagant ..................... 439/523 |
| 3,701,835 A | 10/1972 | Eisele et al. |
| 4,675,779 A | 6/1987 | Neuwirth |
| 4,681,383 A | 7/1987 | Hung et al. |
| 4,721,056 A | 1/1988 | Steeley |
| 4,988,834 A | 1/1991 | Birch |
| 5,323,454 A | 6/1994 | Shay et al. |
| 5,696,864 A | 12/1997 | Smith et al. |
| 6,259,024 B1 | 7/2001 | Daoud |
| 6,291,774 B1 * | 9/2001 | Williams ..................... 174/139 |

* cited by examiner

*Primary Examiner*—Dean A. Reichard
*Assistant Examiner*—Jinhee Lee
(74) *Attorney, Agent, or Firm*—B. Craig Killough

(57) ABSTRACT

A cap for conduit ends, through which electrical or communication cables extend. The cap has a hollow body, into which an open end of a conduit is accepted at a lower portion. The upper portion of the cap has a passageway comprising voids through which the cable extends. Between the top of the cable cap, and at the top of the cable cap, the cap is shaped so that there are no substantial horizontal surfaces that are of sufficient dimension to permit rodents or other vermin to sit on the cable cap and chew on the cables. At the same time, the cap prevents water and foreign objects from entering the conduit.

9 Claims, 3 Drawing Sheets

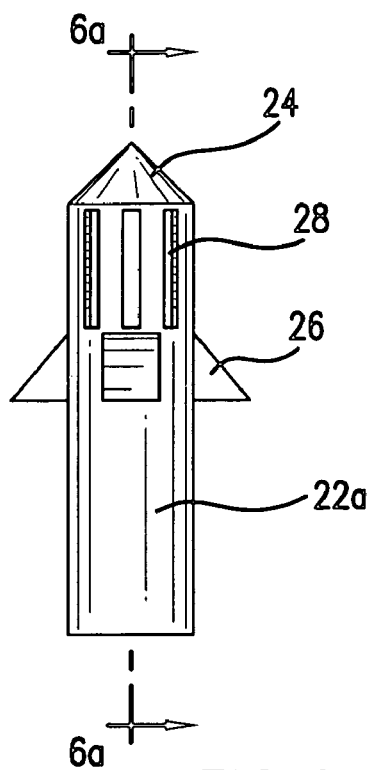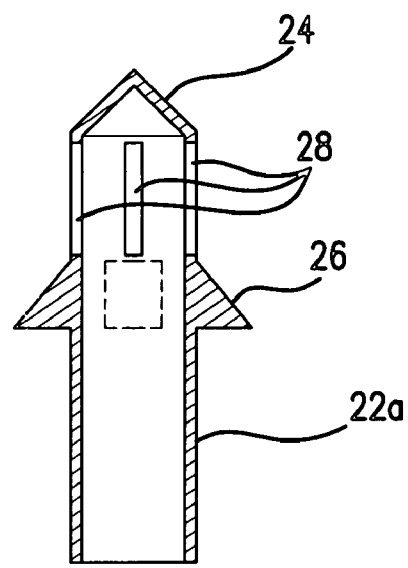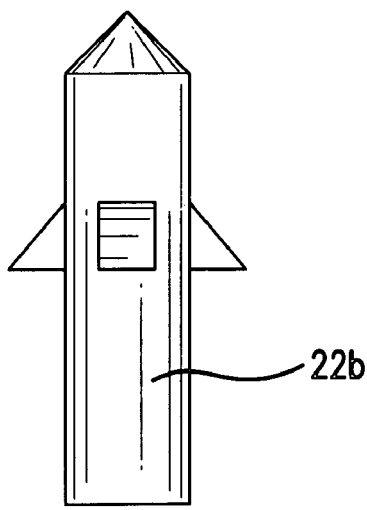
FIG. 6    FIG. 6a
FIG. 7

CAP FOR CABLE CONDUIT

FIELD OF THE INVENTION

This invention relates to devices for electrical power and communications transmission generally, and is more specifically directed to an end cap for conduit through which cable extends.

BACKGROUND OF INVENTION

Electrical power transmission cables and lines, and telecommunications cables and lines, are frequently positioned within conduit. The conduit contains and protects the cables as they are used to transmit electrical power or communication signals.

In a common application, cables are contained in conduit and buried underground. In other embodiments, the conduit may travel along structures, such as bridges, with the cables contained within the conduit. The conduit may exit an underground application, in which it is positioned horizontally, and then extend vertically, so that electrical power or communication signals can be harvested from the cable. As the conduit extends vertically, it may be attached to a pole or other support structure. Ultimately, however, there must be an end to the conduit, so that the cable extends out of the conduit. The cable may then be attached to other cables, such as by a junction, or attached to an appliance, such as a transformer, or other device that uses the electrical power or communications signal.

Accordingly, the conduit will have an end point. In many applications, the conduit is extending vertically as it ends. The end of the conduit has a generally circular cross section, and is fully exposed to, and receives, rainfall and other forms of precipitation within the conduit. The conduit is also exposed to objects that may fall within the conduit. To combat this problem, end caps have been created for the conduit. The end caps in use are flat, so that when the conduit is positioned vertically, the cap has a generally horizontal top surface. Voids are provided within the caps that allow the cables to exit through the surface of the caps.

A significant problem is that the cables, and in particular, the insulation for the cables, is attractive to rodents and other vermin, and in particular, squirrels. The resilient nature of the insulation makes it particularly attractive to squirrels. Many rodents have teeth that are as hard as steel, and accordingly, squirrels and other rodents can do substantial damage to cables, and even sever the cables.

While end caps as known and used in the prior art may prevent or reduce the incidence of precipitation or objects entering the conduit, the end caps actually promote the incidence of animal attacks upon the cable. The end caps provide a seat for squirrels while the squirrels chew on the electrical cables or communications cables. Squirrels can sever the cables, meaning that entire communities, factories and other businesses can lose electrical power or communications due to these attacks, which are promoted by the cable conduit end caps as used in the prior art.

SUMMARY OF THE PRESENT INVENTION

This present invention is a cap for conduit through which electrical or communication cables extend. The cap has a hollow body, into which an open end of a conduit is accepted at a lower portion. The upper portion of the cap has a passageway comprising voids through which the cable extends. Between the top of the cable cap, and at the top of the cable cap, the cap is shaped so that there are no substantial horizontal surfaces that are of sufficient dimension to permit rodents or other vermin to sit on the cable cap and chew on the cables. The cable cap is shaped so that there are no generally horizontal surfaces that are of sufficient dimension to permit rodents or other vermin to sit on the cable cap. At the same time, the cap prevents water and foreign objects from entering the conduit.

DESCRIPTION OF DRAWINGS

FIG. 6 is an elevation of a probe having a vent through the probe.

FIG. 6a is a sectioned view of the probe of FIG. 6.

FIG. 7 is an elevation of another embodiment of a probe.

DESCRIPTION OF THE PREFERRED EMBODIMENT

Figure 1:
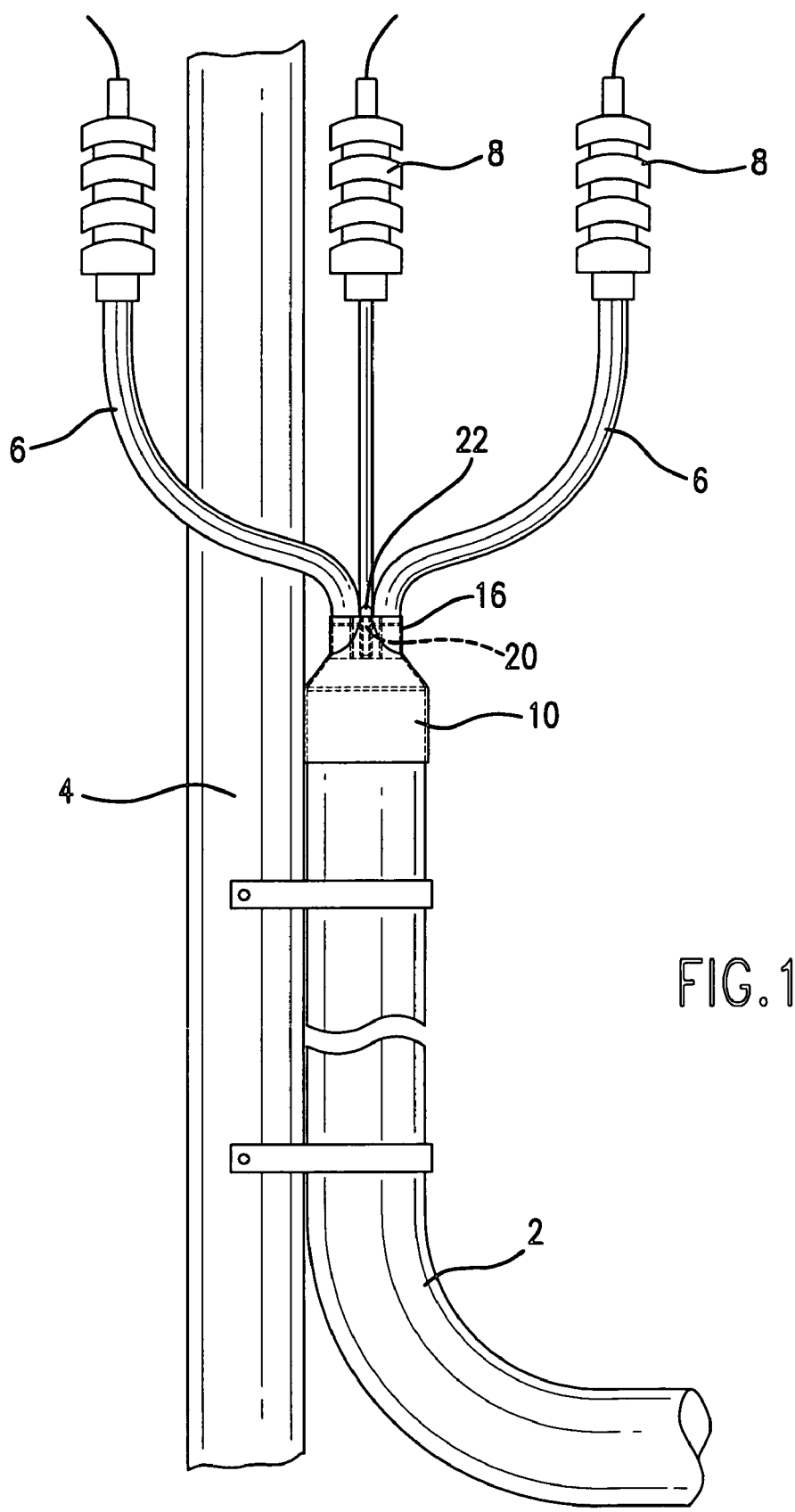
FIG. 1 is an elevation of a conduit transitioning from a horizontal position to a vertical position, with the conduit attached to the vertical pole, demonstrating the cable cap of the invention in place, and cables extending therefrom.

Referring now to the drawing figures, FIG. 1 shows a conduit 2 that is transitioning from a horizontal position to a vertical position. The conduit as shown has a generally circular cross section. The conduit is attached to a vertical pole 4 for support, as is common in electrical utility applications. The conduit as shown in FIG. 1 has three cables 6 contained therein and extending there from, as is common in electrical utility applications. The cables extend out of an end of the conduit and are routed through insulators 8, which may be mounted to a utility pole or other support. The vertically extending conduit is subject to precipitation entering the end of the conduit, if a cap or other barrier is not present over the opening to the end of the conduit.

Figure 2:
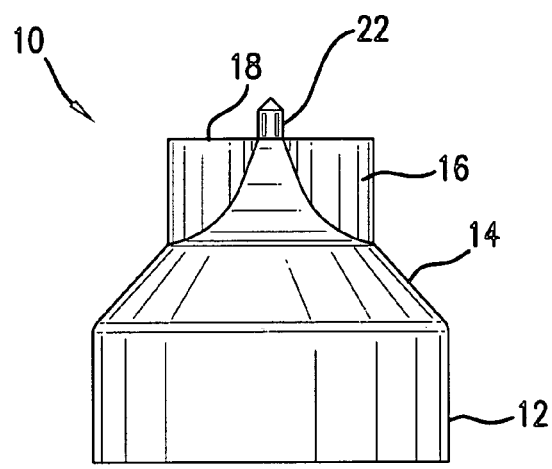
FIG. 2 is an elevation of the cap for cable conduit.
Figure 5:
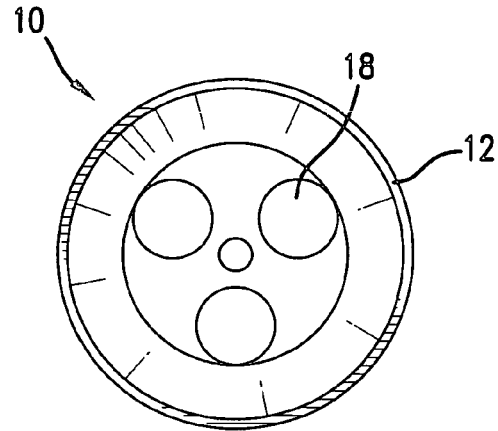
FIG. 5 is a bottom view of the cap of the present invention.

A preferred embodiment of the cap 10 according to the present invention is shown in FIGS. 2 through 5. In use, the cap will typically be oriented as shown in FIG. 2. As shown in FIG. 5, the lower portion 12 of the cap has a generally circular cross section, and the bottom portion of the cap receives the generally circular conduit therein, so that the conduit is inserted into the cap, as shown in FIG. 1. The cap may be pressed to fit over the conduit, or it may be secured using an appropriate adhesive or fastener.

Figure 3:
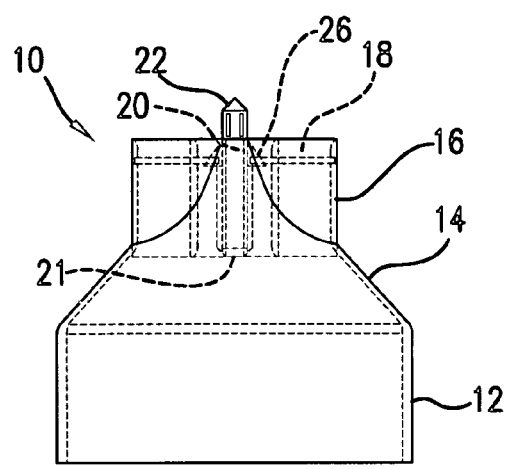
FIG. 3 is the elevation of the cap at FIG. 2 with the internal structure of the cap shown as a phantom.
Figure 4:
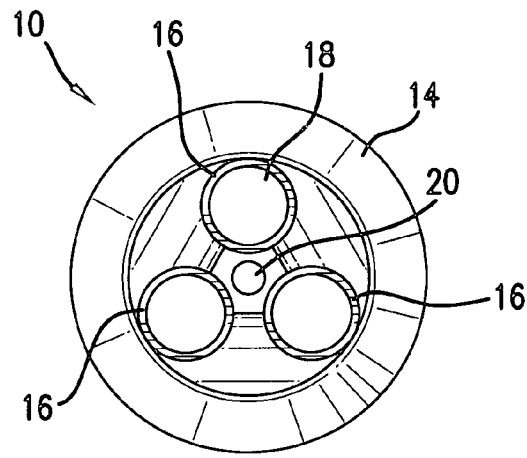
FIG. 4 is a top plan view of the cap of the present invention.

While the lower portion has a generally circular cross section of consistent diameter, a center section 14 of the cap in the preferred embodiment has a frusto conical shape, as particularly shown in FIG. 3. The frusto conical shape provides a relatively steep angle that prevents animals from resting on the sides of the cap. The frusto conical shape reduces the dimension of the cap at the upper portion of the cap, so that there is no platform or base for animals to rest upon at the upper portion. This structure is demonstrated by FIG. 2 and by FIG. 4. The upper portion of cap has no generally horizontal portion of any appreciable size that will permit an animal to rest upon the top of cap. The upper portion of the cap forms a passageway 16. The passageway receives the cables, and provides a plurality of openings 18 through which the cables extend, as is shown by FIG. 1 and by FIG. 4. The number of voids is dependent upon the maximum number of cables that may be required to extend through the cap. The voids extend upwardly from the center portion of the body.

As shown in the preferred embodiment, the body has a lower section 12, a center portion 14 which may be an inverted frusto conical shape, and a passageway 16 formed in the upper portion, with an opening 18 formed in each passageway. The passageway may adjoin, and be positioned over, the upper surface of the center portion of the body of the can.

The resulting cap does not yield a horizontal surface that is sufficient for an animal to sit or rest, and does not encourage an animal to damage the cables. However, to the degree that it may be possible for an animal to position itself over the passageways and between the cables, particularly where a large number of cables are present, in one embodiment of the device, a receiving aperture 20 is formed in the body 10 and between the passapeways for the cable. A probe 22 may be inserted into the aperture. The probe extends generally vertically from the aperture 20 and above the remainder of the body of the cap, including the passageways. Alternatively, the probe may be formed as an integral part of the body of the cap.

Two embodiments of the probe 22a, 22b are shown in FIGS. 6 and 7. The probe is a generally vertical member, with a pointed end 24 formed on the top thereof in the preferred embodiment. Wing shaped extensions 26 may protrude from the probe, to further retard an animal from being able to rest on the body of the cap. One of each of the wings may extend between two of the openings 18, and over the top surface of the body of the cap, to further remove the possibility of horizontal surfaces being present upon which an animal may gain a foothold. The difference between the embodiment shown in FIG. 6 and the embodiment shown in FIG. 7 is that the embodiment of the probe shown in FIG. 6 provides a plurality of vents 28 which communicate with the conduit, so that the conduit is vented. The vent may communicate with the body of the cap through opening 21 in aperture 20. FIG. 3; FIG. 6a.

The cap 10 of the present invention is mounted on the conduit as shown in FIG. 1. The conduit extends into the cap, and the cables extend through the openings in the passageway of the cap. The probe 22 extends from the center and upper portion of the body of the cap, and above the remaining surfaces of the cap. O-rings may be provided to further prevent water from entering the openings from which the cable extends. Bushings may be inserted through the openings as well for the purpose of reducing the size of the openings according to the size of the cable, so that the caps may accommodate various sizes of cable. Openings may be closed by an insert placed within the opening, if one or more of the openings in the cap as designed are not in use.

The resulting device prevents material amounts of moisture, such as from precipitation, from entering the device. The cap also prevents foreign objects from entering the conduit. The device does not provide a substantial horizontal surface upon which an animal can gain footing, nor does the device provide a seat for the animal, which would facilitate the animal sitting on top of the cap, whereupon it may chew the cables.

What is claimed is:

1. A cap for a cable conduit comprising:
   a) a body having a plurality of spaced apart passageways in an upper portion thereof, with each of said plurality of spaced apart passageways having an opening formed therein through which a cable is received, and
   b) a probe extending upwardly from said body, wherein said probe is positioned between said plurality of spaced apart passageways, and wherein said probe extends above said plurality of spaced apart passageways.

2. A cap for a cable conduit as described in claim 1, said body further comprising an aperture formed between said plurality of spaced apart passageways, wherein a lower portion of said probe is positioned within said aperture that is between said plurality of spaced apart passageways.

3. A cap for a cable conduit as described in claim 1, wherein said probe comprises a pointed upper end.

4. A cap for a cable conduit as described in claim 1, said probe further comprising an cone shaped upper end.

5. A cap for a cable conduit as described in claim 1, said probe further comprising a vent opening.

6. A cap for a cable conduit as described in claim 1, said probe further comprising a vent that opens to an exterior of said probe.

7. A cap for a cable conduit as described in claim 1, said probe comprising a vent that is open within a generally vertical side of said probe, wherein said vent communicates with the conduit, and wherein the conduit is vented through said probe.

8. A cap for a cable conduit as described in claim 1, said probe comprising a wing that extends from a generally vertical side of said probe, wherein said wing extends between a first opening and a second opening of said plurality of spaced apart passageways.

9. A cap for a cable conduit as described in claim 1, wherein a portion of said body has an inverted frusto-conical shape.

* * * * *